June 12, 1923.
F. JANOVJAK
1,458,826
METHOD OF AND MEANS FOR PROJECTING COLORS
Filed June 28, 1920   2 Sheets-Sheet 2
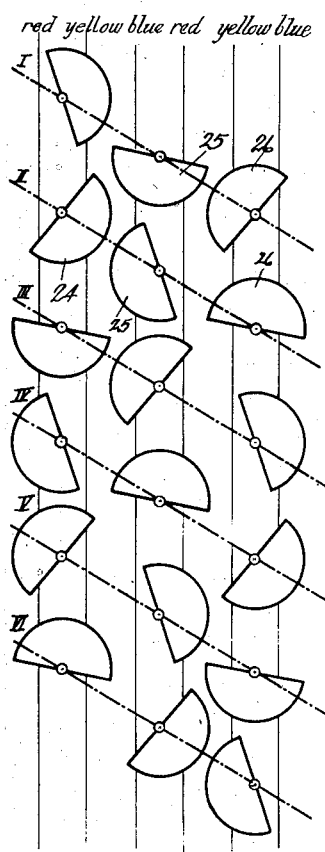
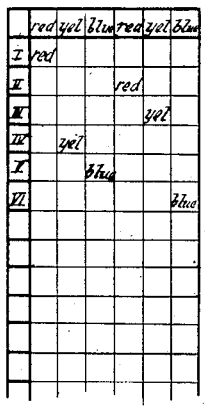
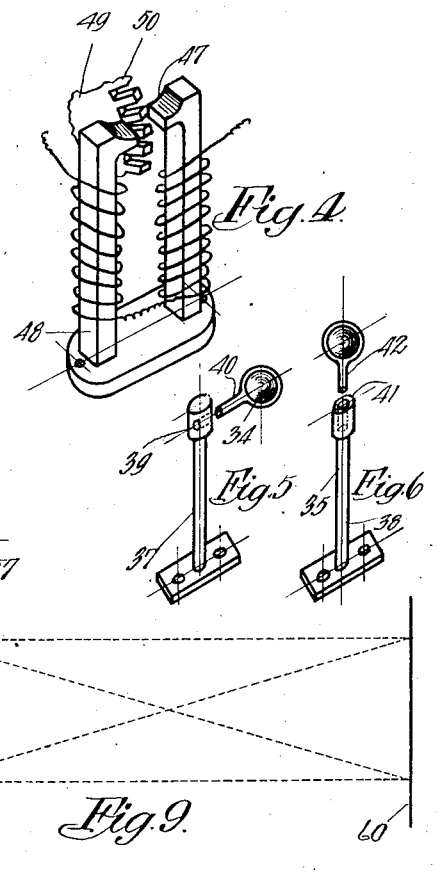
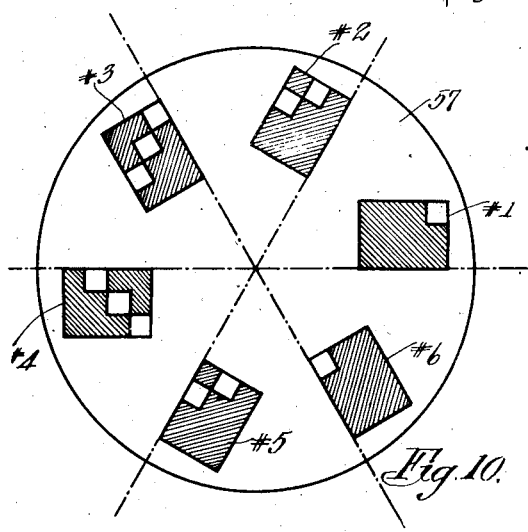
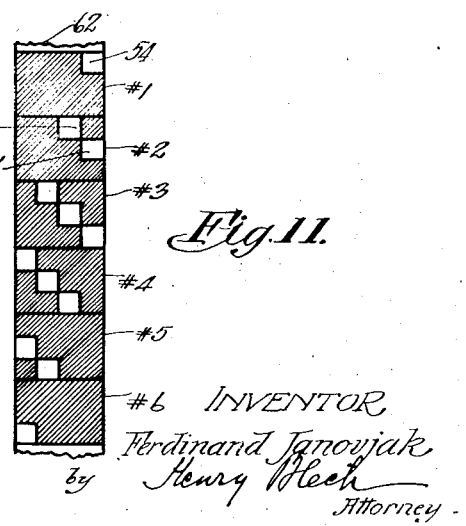

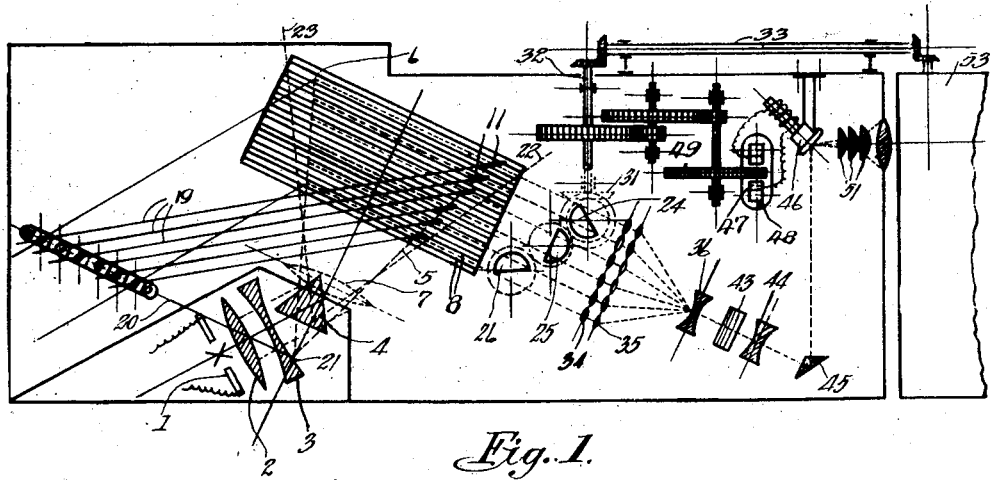

Patented June 12, 1923.

1,458,826

UNITED STATES PATENT OFFICE.

FERDINAND JANOVJAK, DECEASED, BY JOSEF JANOVJAK, ADMINISTRATOR, OF CHICAGO, ILLINOIS.

METHOD OF AND MEANS FOR PROJECTING COLORS.

Application filed June 28, 1920. Serial No. 392,280½.

*To all whom it may concern:*

Be it known that FERDINAND JANOVJAK, late a citizen of Czechoslovakia, deceased, has invented a new and useful Improvement in Methods of and Means for Projecting Colors, of which the following is a specification.

The invention relates to a method of and means for projecting colors whereby an area may be illuminated with different colors in rapid succession. The invention is applicable to the reproduction of motion pictures in natural colors.

The reproduction of motion pictures in natural colors is almost exclusively effected by color screens, whose colors are complementary colors. The difference in hues of the colors on such screens, and the fact that different sources of light are employed when taking and when reproducing the pictures, whereby good colors do not appear are responsible for the unpopularity of motion pictures in colors.

It therefore constitutes an object of the invention to provide a new method of and means for obtaining compensation for defective colors, so that the defects of incomplete complementary colors of screens, or defects in taking pictures may be compensated for to obtain true natural colors.

To this end a white light is separated into its primaries, the primaries deflected by shiftable means allowing a positive or negative correction, and the deflected primaries are thrown on a screen by an optical telephone whereby an area may be illuminated with sufficient intensity.

With these and other objects in view the invention comprises the steps and means for carrying out the improved method described in the following specification and claims and illustrated in the accompanying drawings in which the means for carrying out the improved method are shown more or less diagrammatically.

Fig. 1 is a diagrammatic plan view of the apparatus for carrying out the method.

Fig. 2 is an elevational view of the parts shown in Fig. 1.

Fig. 3 is a perspective view of the deflecting means and associated parts.

Fig. 4 is a perspective view of a generator to obtain electric impulses.

Figs. 5 and 6 show in perspective lenses for portioning the primaries in a common horizontal plane and to meet in a single point.

Fig. 7 is a diagrammatic representation of the various positions of the shutters during operation of the apparatus to selectively permit certain primaries to pass and shut off others.

Fig. 8 is a table to depict the order in which the primaries are permitted to pass for projection onto a screen.

Fig. 9 illustrates diagrammatically the manner of producing films to obtain colored reproductions for advertising purposes.

Fig. 10 is an enlarged view of disk used in the arrangement shown in Fig. 9 to produce a film.

Fig. 11 is a view of a portion of a film.

Referring to the several views of the drawing, 1 designates an arc lamp or other suitable or satisfactory source of light from which the white rays pass through a condenser lens 2 and a concave lens 3 whereby a bundle of parallel rays impinge against a prism or grating 4 and are separated into their primaries. The spectrum extends between the terminal rays 5 and 6. The angle between the rays 5 and 6 may be varied by providing a lens 7 indicated in dotted lines in Fig. 1. The purpose of this lens will hereinafter be further referred to. In the field of the spectrum a stepped block 8 is provided as shown in Fig. 3. The horizontal portion of each step is formed with a groove 9 of continuous cross section extending the entire length of the block. In these grooves slides such as 10 are arranged for longitudinal adjustment. Rotatably secured to each slide is a reflecting mirror 11 which enters a vertical bore 12 in the slide with a stem. As indicated in Fig. 1 the mirrors 11 are all in a position to deflect the impinging primary. As a rule, however, the mirrors will be arranged so, that for instance two mirrors deflect the red primary, the following two mirrors will be arranged in the path of the yellow primary while the remaining mirrors will be arranged in the path of the blue primary. The arrangement of the mirrors in proper position is effected by the longitudinal shifting of the slides. Thus some of the mirrors will be arranged in the path of the primary 6 constituting the blue color, others will occupy an intermediate position to be in the path of the yellow color, while the remaining mirrors will occupy the position shown in Fig. 1.

In order to ascertain that after longitudinal displacement of a slide its mirror still occupies a portion in which the primaries are deflected into the proper direction provision is made that during displacement or adjustment travel of the mirror simultaneously a slight rotary movement is imparted thereto so that the primaries are always deflected into the proper direction irrespective of the displacement of the mirror by way or adjustment.

To this end a standard 14 is provided (Fig. 3) which is of stepped formation similar to block 8. The number of steps of standard 14 corresponds to the steps of block 8 and each step has a vertical bore 15 to receive the stem 16 of a member 17 formed with a horizontal bore 18. A rod 19 is slidingly fitted in the bore 18 and is secured to the rear side of the mirror.

It is of course obvious that there are as many members 17 as mirrors 11, the members and mirrors being respectively interconnected, for which purpose they are arranged in the same horizontal planes as shown in Fig. 2.

The longitudinal axis 20 of the standard 14 intersects the rays 5, 6 and 21. This is an essential condition. In order to enhance the angle between the rays 5, 6 and thereby focus the rays close to the prism the lens 7 is employed so that the terminal rays will then be at 22 and 23. The primaries after deflection by the mirrors 11, meet with a plurality of rotary shutters designated by 24, 25, 26 comprising semi-cylindrical bodies rotating about their vertical shafts. The shutters have secured to their shafts gears 27, 28 and 29 respectively which gears intermesh. The shaft of gear 29 carries a bevel gear 30 in mesh with bevel gear 31 secured to a shaft 32. The latter is geared to a drive shaft 33 which is rotated by any suitable source of power. The shutters 24, 25, 26 are of semi-cylindrical form and are offset relatively to each other so that upon continuous rotation they occupy positions whereby certain of the primaries may pass while others are held back.

Referring to Figs. 7 and 8 in the position indicated by I, the shutters are so arranged that the first red ray may pass. In the position II the second red ray passes, in the position III a yellow primary passes, in position IV, the other yellow primary passes, in positions V and VI blue primaries pass. This is conventionally indicated in the chart of Fig. 8.

As explained before this succession of passing primaries is obtained by arranging two mirrors in the path of the red, yellow and blue primaries, whereupon in the continuous rotation of the shutters the primaries are permitted to pass in the following order: red red, yellow yellow, blue blue. The position of six mirrors is only indicated by way of example. Any large number of mirrors or lesser number may be employed as will be readily understood.

Attention is called to the fact that the semi-cylindrical shutters occupy positions to form 120° angles relative to each other, a primary passing upon each partial rotation about 60°.

The angular velocity of the gears 27, 28, 29 must equal the feed velocity of the film upon which the primary is thrown to produce picture in natural colors.

It may already now be stated that films are employed which have been taken through red, yellow and blue filters, but the employment of filters for reproduction is dispensed with in carrying out my improved method.

Instead of films taken through filters, colour sensitive films may be employed, such as obtained by placing a mirror behind the film in taking pictures whereby the light rays are reflected back upon the film and create different conditions in the film emulsion in accordance with the color of the light ray. This method of taking pictures is known as the Lippman's interference method. The light rays after passing the shutters pass through lenses 34, 35 whereby they are brought in a common level to pass through lens 36. This is effected in the following manner: The rays leaving the shutters meet with the lenses 34 which are also arranged in stepped formation. The lenses 34 being capable of rotation about their horizontal axes (Fig. 5) are adjusted until all rays meet the lenses 35 which all are arranged in the same height. The lenses 35 being rotatable about a vertical axis (Fig. 6) are adjusted to cause the bundle of rays to unite in the lens 36. As shown in Figs. 5 and 6 the lenses 34, 35 are arranged in standards 37 and 38 respectively. The standard 37 has an enlarged upper portion traversed by a horizontal bore, 39, to receive the stem 40 of the lens holder. The standard 38 has at its upper end an enlarged portion equipped with a vertical bore 41 to receive loosely the stem 42 of the lens holder.

The light ray eminating from lens 36 is magnified by the lens 43 and passes through the condenser 44 and impinges upon a prism 45 by which it is reflected on a so called optical telephone 46 operating on the Pollak-Virag principle. If preferred an oscillograph may be employed. The telephone is equipped with a nickel plated diaphragm which is vibrated by a pulsating current generated by a toothed wheel 49 rotating between the pole piece 47 of a permanent magnet 48. The lines of force of the magnet 48 are intermittently interrupted by the teeth 50 of the wheel 49 and thus give rise to pulsating currents.

The light ray deflected by the telephone oscillates and passes through lenses 51. A lens projects the ray onto a screen or film.

The ray of light is thus projected onto the film in the machine 53 which moves with the same velocity as the shutters. The pictures on the film are either taken through a filter or according to the interference method of Lippman and are thus projected onto the screen with an intense, brilliant color which by shifting of the mirrors in positive or negative direction may be modified to increase or decrease in intensity until the proper hue is obtained.

The invention is not limited, however, to the projecting of moving pictures but may be utilized wherever the obtention of brilliant colors is desired.

To project for instance a mozaic picture having six colors, a film 62 is produced on which picture #1 has a small square 54 in the upper right corner transparent while the remainder is black. Picture #2 has two squares 55, 56 transparent and the remainder translucent. Pictures #3, 4, 5 and 6 have respectively three, three, two and one transparent squares which are so arranged that if superposed they present a complete checkerboard of transparent squares. The film is produced by placing six pictures on a rotary disk 57, the pictures being arranged 60° apart and having transparent squares arranged as shown. The disk 57 (Fig. 9) is rotated synchronously with the shutters of the apparatus 58 and 59. The pictures of the apparatus 58 are projected onto a screen 60 and the pictures of the screen are photographed by the apparatus 59 in which the film 62 is thus produced. The film is then placed in the path of the deflected primaries and a mosaic picture is reproduced on the screen.

The invention may also be utilized for advertising purposes to illuminate objects by a succession of colors whereby an object is conspicuously set off. The color array of a diamond may be imitated and produced in a display window to attract the attention of pedestrians.

The invention has been described and illustrated in its generic aspects. No attempt has been made to introduce specific features of construction or arrangement except as necessary to render the invention intelligible. All specific construction and arrangements, changes in the sequence of steps of the method and similar alterations, are included in the invention which is claimed as broadly as the state of the art permits.

I claim:

1. The method of projecting colors, including the steps of separating a white light ray into its primaries, deflecting the primaries, and oscillating each primary to cover an area on a screen.

2. The method of projecting colors, including the steps of separating a white light ray into its primaries, deflecting the primaries, and oscillating in timed succession each primary to cover an area on a screen.

3. The method of projecting colors, including the steps of separating a white light ray into its primaries, deflecting the primaries, permitting the primaries to reach the screen in a predetermined order, and oscillating each primary prior to reaching the screen to cover an area thereon.

4. The method of projecting colors, including the steps of separating a white light ray into its primaries, deflecting the primaries, permitting the deflected primaries to successively reach a screen, and oscillating each primary prior to reaching the screen to cover an area thereon.

5. The method of projecting colors, including the steps of separating a white light ray into its primaries, deflecting the primaries, permitting the deflected primaries to successively reach a screen, oscillating each primary prior to reaching the screen to cover an area thereon, and varying the locations from which the deflections are obtained until a satisfactory color is produced.

6. The method of projecting colors, including the steps of separating a white light into its primaries, deflecting the primaries, altering the primaries to permit their passage in succession, deflecting each primary, and oscillating each primary to cover an area on a screen.

7. The method of producing motion pictures in natural colors, including the steps of separating a white light into its primaries, deflecting certain primaries, and oscillating each primary to cover an area on a film adapted for the purpose.

8. In an apparatus of the kind specified, a prism for separating a white light into its primaries, a plurality of mirrors for deflecting the primaries, means for permitting passage of the deflected primaries in a predetermined order, and means in angled association with said prism and mirrors for maintaining the mirrors in functional position.

9. In an apparatus of the kind specified, a prism for separating a white light into its primaries, a plurality of mirrors for deflecting primaries, and a plurality of shutters for permitting successive passage of said primaries.

10. In an apparatus of the kind specified, a prism for separating a white light into its primaries, a plurality of mirrors for deflecting primaries, and a plurality of continuously driven shutters for permitting successive passage of said primaries.

11. In an apparatus of the kind specified, a prism for separating a white light into its primaries, a plurality of mirrors for deflecting primaries, a plurality of rotary shutters for permitting passage of said primaries in a predetermined order, and means for oscillating each primary to cover an area on a screen.

12. In an apparatus of the kind specified, a prism for separating a white light into its primaries, a plurality of mirrors for deflecting primaries, a plurality of rotary shutters for permitting passage of said primaries in a predetermined order, and an optical telephone for oscillating each primary to cover an area on a screen.

13. In an apparatus of the kind specified, a prism for separating a white light into its primaries, a plurality of adjustable mirrors for deflecting the primaries onto a screen, and a plurality of rotary shutters interposed in the path of the deflected primaries and adapted to permit passage of the primaries successively in a predetermined order.

14. In an apparatus of the kind specified, a prism for separating a white light ray into its primaries, a plurality of adjustable mirrors for deflecting the primaries onto a screen, means for maintaining the mirrors in proper position throughout the range of adjustment, and a plurality of rotary shutters adapted to permit passage of the deflected primaries successively and in predetermined order.

15. In an apparatus of the kind specified, a prism for separating a white light ray into its primaries, a plurality of adjustable mirrors for deflecting the primaries onto a screen, means for maintaining the mirrors in proper position throughout the range of adjustment, a plurality of rotary shutters adapted to permit passage of the deflected primaries successively and in predetermined order, and means for rotating said shutters.

16. In an apparatus of the kind specified, a prism for separating a white light ray into its primaries, a plurality of adjustable mirrors for deflecting the primaries onto a screen, means for maintaining the mirrors in proper position throughout their range of adjustment, a plurality of rotary shutters adapted to permit passage of the deflected primaries successively and in predetermined order, means for rotating said shutters, and means for imparting an oscillating movement to said primaries prior to reaching a screen.

In witness whereof I affix my signature.

JOSEF JANOVJAK,
*Administrator of Ferdinand Janovjak, deceased.*